United States Patent Office 2,823,044
Patented Feb. 11, 1958

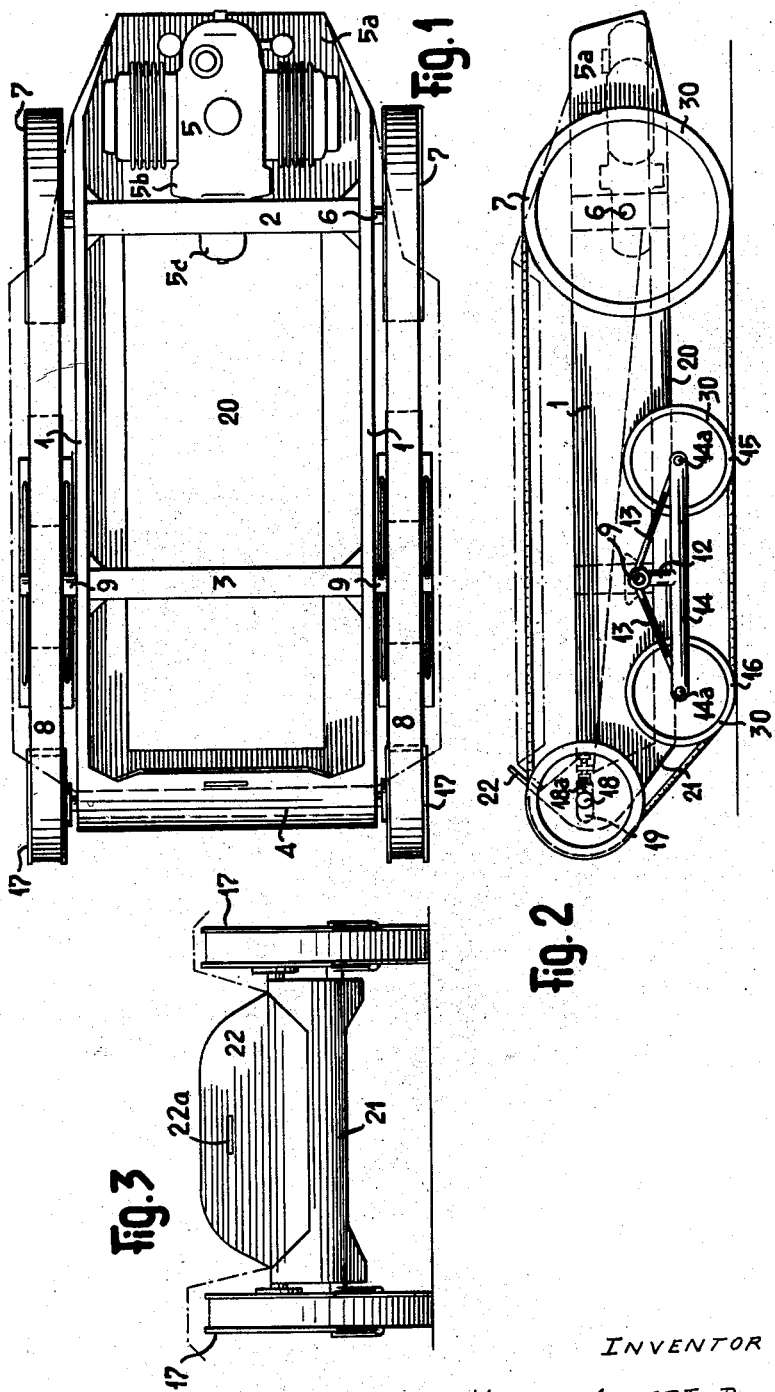

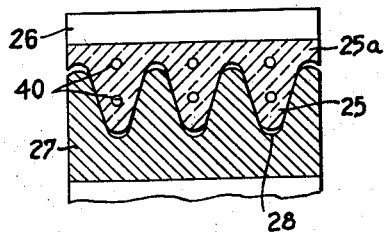
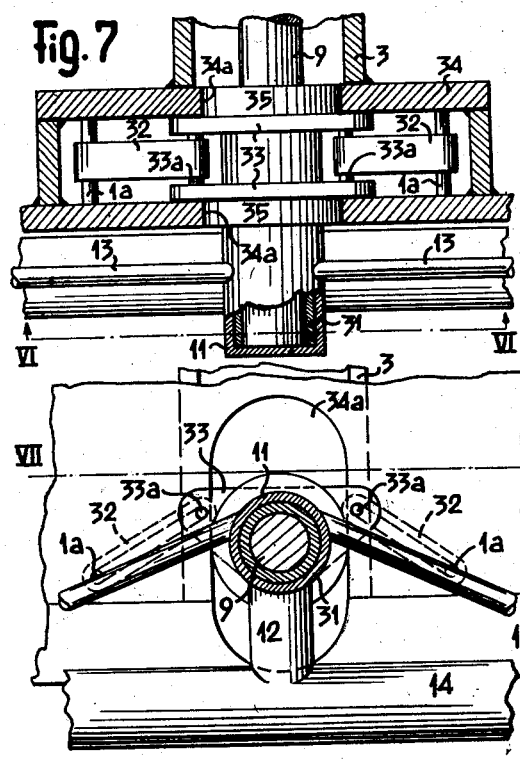
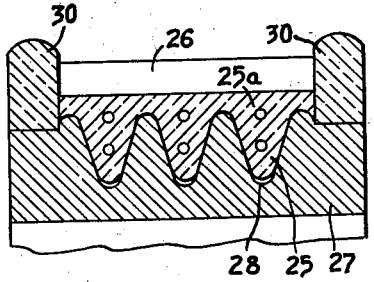
Fig. 7
Fig. 4
Fig. 6
Fig. 5
INVENTOR
VICTOR ALBERT BOUFFORT
By: Young, Emery & Thompson
Attys.

2,823,044

TRACKED VEHICLE SUSPENSION

Victor Albert Bouffort, Paris, France, assignor to Mecatec S. A., Tangiers, a limited liability stock company of Tangiers Application January 29, 1954, Serial No. 407,097

Claims priority, application France February 2, 1953

4 Claims. (Cl. 280—106.5)

The present invention has for its object a vehicle comprising a frame carried by carrying wheels on which pass endless tracks driven by driving wheels actuated by means of an engine through a clutch, a gear-box and a differential connected to the driving wheels by transmission shafts.

Vehicles of this kind proposed till now are not adapted to the present requirements, owing to their excessive weight and their insufficient mobility. Indeed, having regard to the piercing power of ammunition used against tanks, steel armour platings of 25 to 30 centimetres thickness are insufficient. A plating of such thickness imposes an extremely heavy construction, which necessarily leads to the turning out of vehicles weighing 40 tons and over, which, as a consequence, are not very mobile and constitute easily reachable targets.

The tracked vehicle which is the object of this invention aims at remedying these drawbacks by the fact that it comprises a frame constituted by two lateral spars connected together by transversal girders in which are housed transmission shafts connecting the driving wheels to the differential, and by the fact that each track is constituted by a flexible and elastic endless ribbon.

The attached drawing illustrates by way of example and diagrammatically an embodiment of the tracked vehicle in accordance with the invention.

Fig. 1 is a top view of same.

Fig. 2 is a side view.

Fig. 3 is a front view.

Fig. 4 is a cross-section view, at larger scale, of a caterpillar.

Fig. 5 is a cross-section view of a modified caterpillar embodiment.

Fig. 6 is a part side view, at larger scale, showing the mechanical connection linking the carrying wheels to the frame, certain parts being seen in cross-section taken along line VI—VI of Fig. 7.

Fig. 7 is a cross-section taken along line VII—VII of Fig. 6.

According to Figs. 1 to 3 of the drawing, the vehicle comprises a frame constituted by two rigid lateral spars 1 and three transverse girders 2, 3, 4. The lateral spars are constituted by iron bars U-shaped in cross section or by hollow cylinders. The transverse girders are constituted by compartments or hollow cylinders rigidly fastened to the spars, for instance by welding. These spars and these girders form a rigid frame on which are rigidly fixed light metal plates. A plate 20 forming the floor extends at the front by an inclined apron 21 and a mask 22 provided with ports 22a affording the driver the necessary visibility. On the sides, the lateral spars 1, also made of light metal, protect the cockpit.

Finally, at the rear of the vehicle, a compartment 5a, closed on all sides, is provided to house an internal combustion engine 5, connected by a clutch housed in a casing 5b to a gear-box housed in a casing 5c. This gear-box drives a differential which is also housed in the casing 5c and which actuates two transmission shafts 6 carrying each a driving wheel 7. The transmission shafts are housed in the transverse girder 2 which is provided, at its central part, with two opposed openings, traversed by the casing 5c of the gear-box. This casing is therefore supported by this girder 2.

The girder 3 is traversed by a carrying shaft 9, of which the ends carry the carrying wheels 15 and 16 by means of a mechanical connecting device shown in detail in Figs. 6 and 7.

Each end of the shaft 9 carries a socket 31 constituting a bearing for a sleeve 11. The latter is connected by braces 13 and by a stay 12 to a carrier 14. Each end of this carrier carries an axle 14a carrying a wheel 15, 16.

The sleeve 11 carries two flanges 33 having a generally triangular shape and connected one to the other by two bars 33a. Elastic rings 32, made for instance of sheeted rubber, elastically connect these bars 33a to bars 1a rigidly fastened to each spar 1 by means of a support 34 provided with a guiding port 34a in which slide two rubber rings 35 engaged on each sleeve 11.

The front girder 4 constitutes a support for tensioning and guiding wheels 17 of the endless track 8. Each end of the girder 4 comprises a slide 19 which is approximately horizontal. An axle 18, traversing the girder 4 slides in these sliding parts 19. This axle 18 is subjected to the action of springs 18a tending to keep each tensioning wheel 17 in its most advanced position, in order to keep the endless track taut.

These endless tracks 8 are each constituted by a profiled endless ribbon made of a flexible and elastic material such as rubber. According to the embodiment represented on Fig. 4, each track is formed by a jointless ring, fitted on its internal face with longitudinal ribs 25 connected together by a strip 25a. In transverse cross-section, these ribs presents the general form of a triangle. These ribs 25 are reinforced by steel cables 40 and are engaged in grooves 28 of corresponding shape made in the wheels 17, the carrying wheels and the driving wheels.

These grooves 28 can be made in the rims of these wheels or in mountings 27 engaged on the rims of these wheels.

Finally, each track carries on its external face cleats 26, also made of flexible and elastic material, such as rubber. These cleats have the general form of transverse parallelipipeds parallel each to the others.

In the embodiment shown on Fig. 5, the tracks present approximately the same form as the one described with reference to Fig. 4. However, the carrying wheels 15 and 16 are fitted with two lateral flanges 30 between which pass the track. It is clear that the wheels 17 and the driving wheels 7 may be fitted with mountings comprising lateral flanges. These flanges efficiently oppose the throwing of the track when the latter is subject to lateral forces, for instance when sharp turns take place. In addition, these flanges 30 may also be useful for guiding the vehicle on a railway track. Indeed, if the spacing of the tracks is provided equal to the gauge of a railway track, it is then possible to follow said track with the described vehicle, the flanges 30 preventing a derailment.

The described vehicle can be steered in the usual manner by braking one of the driving wheels 7.

From the above and from the study of the attached drawing, it is easy to realize the advantages presented by the described vehicle.

Its frame, of very simple but sturdy design, enables to achieve a light vehicle, having a slight height and being easy to camouflage.

The engine and the vital mechanical members of the vehicle are housed at the rear, so that they are less vulnerable. The cockpit being light, it is easy to suspend it to a carrier carrying the carrying wheels and elastically connected to said cockpit. The carrying wheels can, due to the articulation of their carrier in relation to the frame, follow the ground undulations. In addition, due to the elastic suspension of the cockpit, it is possible to reach high speeds over any ground without danger for the driver and his helper. These high speeds can moreover be reached without subjecting the driving wheels 7 and the wheels 17 to excessive strains, due to the fact that each track is constituted by a single part made of flexible and elastic material such as reinforced rubber, so that each track is of light weight, less than 50 kgs., for instance.

It is obvious that many embodiment modifications can be provided for, adapted to the various requirements imposed. The various described members and elements can be simply replaced by their equivalents without departing from the scope of the claimed protection.

Thus, for instance, the carrying wheels could be independent each from the others and be carried each by a lever articulated on the frame. The free end of this lever could be elastically connected to the frame, in order to obtain an elastic suspension of the cockpit.

In another embodiment, the vehicle could comprise three independent carrying wheels arranged on each of the lateral sides; the carrying wheels could then be overelevated, so as to be no longer in contact with the ground. The profile of the tracks must obviously be chosen, in order, on the one hand, to avoid as far as possible the accidental throwing of the track out of its guides and, on the other hand, in order to obtain a good adherence to the ground. Sweeping devices can be provided to cause the ejection of stones wedged between the ribs, thus ensuring the good running of the vehicle.

I claim:

1. In an engine driven vehicle having endless tracks and comprising a frame and bogie wheels, the combination with said frame of a transverse hollow frame member rigidly connected to said frame, a bogie-carrying shaft in said hollow frame member, the ends of said shaft extending outwardly of said frame, a carrier member pivoted on each end of said shaft, said bogie wheels being journaled to said carrier member, spaced flanges adjacent each end of said shaft, said frame comprising guide means permitting limited vertical movement of said shaft and cooperating with said flanges to substantially prevent transverse movement of said shaft, spaced anchor bars adjacent said shaft on said frame, and elastic bands extending between said anchor bars and said shaft to yieldingly suspend said frame on said shaft.

2. The vehicle of claim 1, said carrier member comprising a sleeve encompassing an end of said shaft, a vertical stay extending downwardly of said sleeve, and a horizontal carrying bar carried by said stay, said stay and carrying bar being in the form of an inverted T.

3. The vehicle of claim 2, and brace bars extending from points adjacent the ends of said carrying bar to said sleeve.

4. In a tracked vehicle, a frame, a transverse hollow frame member rigidly connected to said frame, a bogie-carrying shaft in said hollow frame member, the ends of said shaft extending outwardly of said frame, a carrier member pivoted on each end of said shaft, bogie wheels journalled to each of said carrier members, each of said carrier members having spaced flanges adjacent the end of said shaft, and at least one rubber ring engaged on said carrier, said frame comprising guide means permitting limited vertical movement of said shaft and carrier and cooperating with said flanges to substantially prevent transverse movement of said shaft and carrier and with said rubber rings to substantially guide the vertical movements of said shaft and carrier, first spaced anchor bars adjacent said shaft on said carrier and located on either side of said shaft, second wide spaced anchor bars on said frame located at a level lower than said shaft, and forwardly and rearwardly thereof, and two elastic rings connecting said first and second anchor bars to yieldingly suspend said frame on said shaft.

References Cited in the file of this patent

UNITED STATES PATENTS

| | | |
|---|---|---|
| 1,450,643 | Platt | Apr. 3, 1923 |
| 1,461,028 | Davis | July 10, 1923 |
| 1,548,664 | Davis | Aug. 4, 1925 |
| 1,593,783 | Stresau | July 27, 1926 |
| 1,804,470 | Knox | May 21, 1931 |
| 2,034,476 | Lemay | Mar. 17, 1936 |
| 2,107,382 | Maddock | Feb. 8, 1938 |
| 2,339,334 | Heaslet | Jan. 18, 1944 |
| 2,462,873 | Knox | Mar. 1, 1949 |
| 2,533,271 | Livermon | Dec. 12, 1950 |
| 2,722,986 | Baldine | Nov. 8, 1955 |

FOREIGN PATENTS

| | | |
|---|---|---|
| 863,592 | France | Jan. 2, 1941 |
| 666,498 | Germany | Oct. 21, 1938 |
| 346,139 | Great Britain | Apr. 9, 1931 |